United States Patent [19]

Krause

[11] Patent Number: 4,768,115

[45] Date of Patent: Aug. 30, 1988

[54] STEPPER MOTOR MAGNETIC HYSTERESIS CORRECTION USING A STEPPING ALGORITHM

[75] Inventor: James N. Krause, Santa Clara County, Calif.

[73] Assignee: Seagate Technology, Scotts Valley, Calif.

[21] Appl. No.: 85,118

[22] Filed: Aug. 14, 1987

[51] Int. Cl.$^4$ .................. G11B 5/55; G11B 21/08; G05B 19/40

[52] U.S. Cl. ........................ 360/78; 318/696

[58] Field of Search ............... 360/75, 77, 78, 105, 360/106, 107, 109; 318/685, 696; 369/32, 33, 41

[56] References Cited

U.S. PATENT DOCUMENTS

| | | | |
|---|---|---|---|
| 4,437,049 | 3/1984 | Tullos et al. | 318/696 |
| 4,489,259 | 12/1984 | White et al. | 318/696 |
| 4,490,662 | 12/1984 | Moribe et al. | 318/685 |
| 4,612,588 | 9/1986 | Tsukahara | 360/78 |
| 4,691,153 | 9/1987 | Nishimura | 318/696 |
| 4,703,242 | 10/1987 | Kumazawa et al. | 318/685 |

Primary Examiner—Raymond F. Cardillo
Assistant Examiner—Steven R. Garland
Attorney, Agent, or Firm—Flehr, Hohbach, Test, Albritton & Herbert

[57] ABSTRACT

The magnetic hysteresis or magnetic memory error in a stepper motor is erased by sequencing the motor phases in a particular manner. In positioning a transducer by energizing selected phases of the stepper motor, the sequence is selected to eliminate the memory of the previous stepper motor position, and reinforce only the new position. This cancellation is achieved by activating the stepper motor to move a transducer from a given track position to an adjacent track position, the sequence of energization of the phases including at least one reversal of the magnetic sense of each phase that was energized to position the transducer at the initial track, but that is not to be energized at the target track; further, the phases not energized at the initial track but that are energized at the target track are reinforced by the selective energization during more than one of the steps used for reaching the target track.

7 Claims, 4 Drawing Sheets

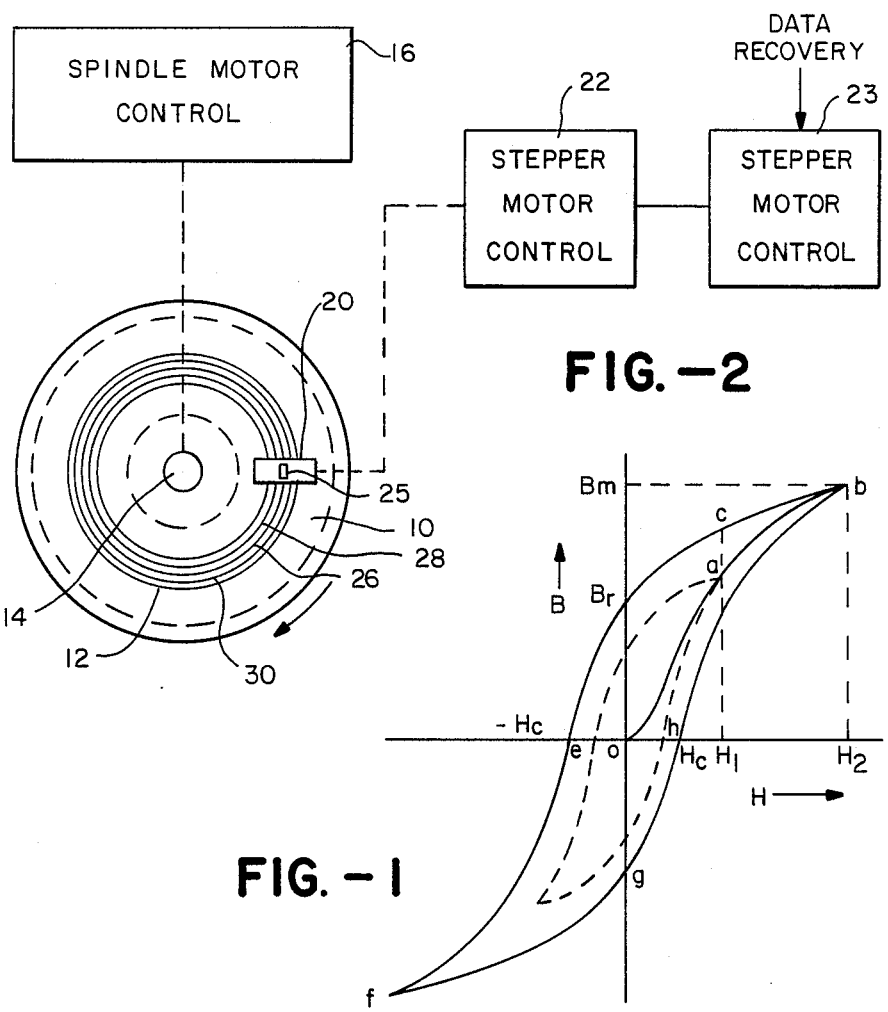
FIG.-2
FIG.-1
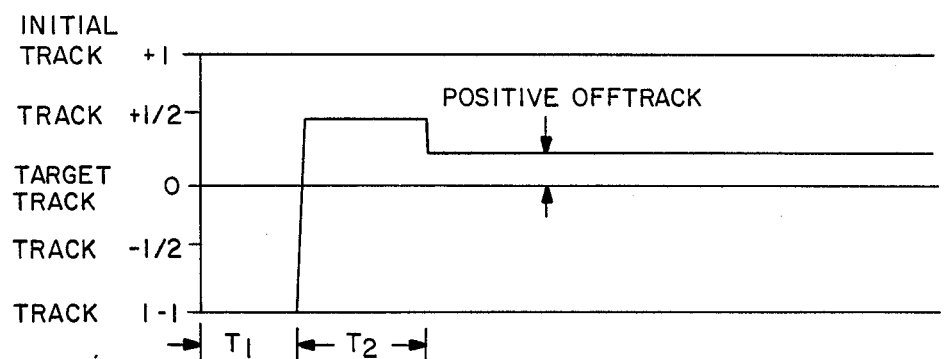
FIG.-5

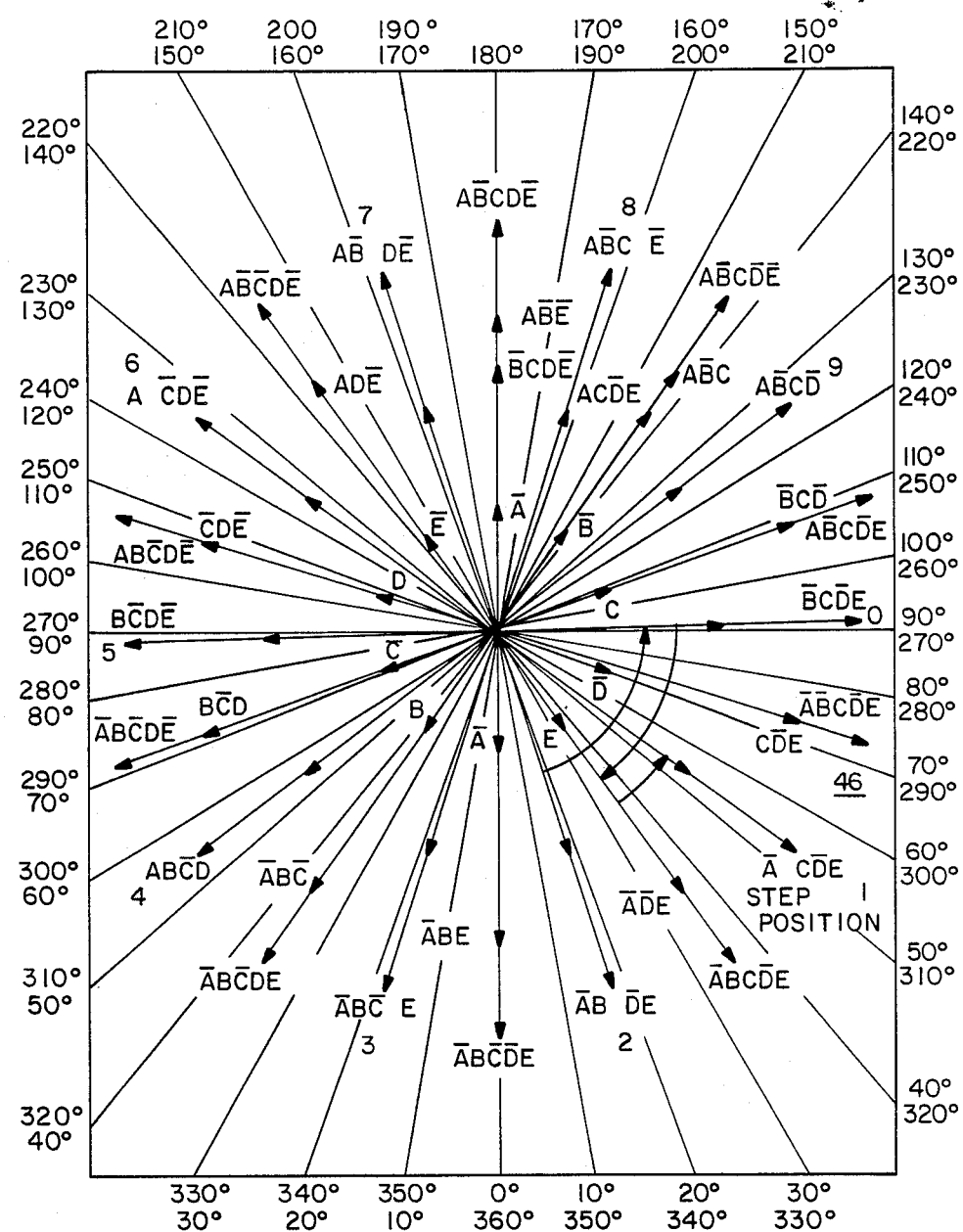
FIG.—4A

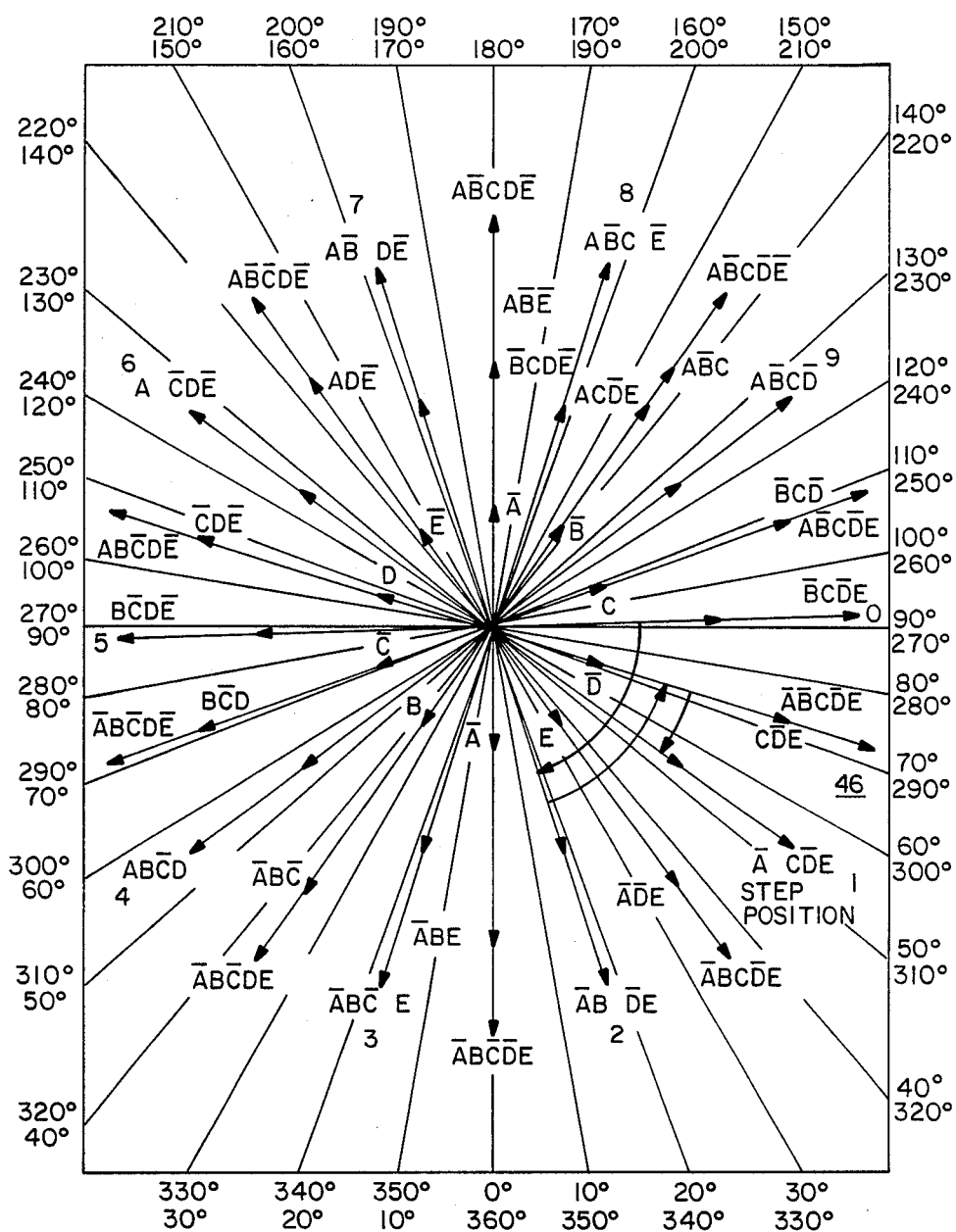
FIG.—4B

STEPPER MOTOR MAGNETIC HYSTERESIS CORRECTION USING A STEPPING ALGORITHM

This invention relates generally to a data recording system, and more particularly to means for accurately positioning movable heads in moving medium recording systems.

BACKGROUND OF THE INVENTION

Rotating disc memory storage devices are used in conjunction with digital computers to magnetically store digital information an non-volatile basis. A typical device of this type includes a spindle rotated by a drive motor mechanism, one or more recording discs attached to the spindle, either permanently or removably, for rotation therewith at a relatively precise constant speed, and an electromechanical read/write assembly for enabling information to be written onto and read from the disc recording surfaces. Each read/write assembly includes a number of transducers for reading and writing data magnetically from and to the individual disc recording surfaces, and a transducer motion translation mechanism, typically operated by a stepper motor, to effect radial motion of the transducers across the recording surface of each disc. The stepper motor is typically driven by conrol circuitry that receives electrical position signals in digital form for the associated computer, and converts this position information into mechanical motion of the transducer heads.

Each annular recording surface of a disc is usually arranged in the form of concentric circular tracks divided in the circumferential direction into track sectors, in order to enable access locations to be accurately specified by the associated computer for rapid and accurate information storage and retrieval.

Recent trends in the development of rotating disc memory storage devices have been toward reduction in the physical size of the system without sacrificing, and in many cases increasing, the storage capacity of each disc. These trends have been especially evident in disc drives designed for use in small business computers and personal computers. Such disc drives employ 5¼" or 3½" fixed rigid discs, removable flexible (floppy) discs or a combination of both. Due to the relatively small surface area available for information storage on such discs, many efforts have been made to maximize the amount of information that can be accurately stored on such discs. These efforts have included a wide variety of specially designed recording techniques, read/write transducers with increasingly narrow heads (to reduce the trace width) and disc recording layers with improved magnetic recording properties and finer surface smoothness.

To obtain the maximum storage capacity for a fixed cost, it is desirable that each disc contain the maximum number of bits and tracks per inch. As the track density increases, however, it becomes increasingly difficult to repeatably precisely position the heads. Accordingly, it is clear that the upper track density limit in most state of the art systems is determined by how precisely the heads can be positioned over a selected track.

Positioning inaccuracy in state of the art disc drive devices is attributable to many factors. One such factor is stepper motor magnetic hysteresis. Hysteresis is the lag of magnetization behind magnetizing force as the magnetic condition of a ferromagnetic material is changed. The phenomenon can be explained with reference to FIG. 1 of this application. When a ferromagnetic sample that is initially demagnetized is subjected to a continuously increasing magnetizing force H, the relation between force H and flux density B is shown by the normal magnetization curve Oab of the Figure. This is the magnetization force.

The curve illustrates the phenomenon that occurs when a coil of a stepper motor is energized to cause movement of the stepper motor through one or more steps to change the position of a transducer head. The point a indicates the magnetic condition as the increasing magnetic intensity reaches $H_1$. If magnetizing force H is increased to a maximum value $H_2$, then decreased again to $H_1$, the decreasing flux density does not follow the path of increase, but decreases at a rate less than that at which it rose. This lag in the change of flux density b behind the change of magnetizing force H is called "hysteresis." Even if the value of magnetizing force H is further reduced from $H_1$ to zero, flux density b is not reduced to zero but to a value $B_r$.

Applying this concept to the energized coils of a stepper motor, a coil, even when deenergized, retains some residual magnetization. Normally several but not all phases of a stepper motor are energized to select a given position for the motor. The residual magnetization of a coil which would not normally be energized in positioning a transducer over a track will result in mispositioning of the transducer relative to the desired track, and a consequent erroneous data read or data storage.

SUMMARY OF THE INVENTION

In view of the foregoing, it is an object of this invention to provide an improved means for positioning the heads in a moving medium recording system.

More particularly, it is an objective here to provide a disc drive transducer positioning system that minimizes positioning error because of stepper motor hysteresis without incorporating a closed loop feedback control system.

A further object is to provide a method and apparatus for using a particular stepper sequence to cancel hysteresis effect in stepper motor coils, or reduce the hysteresis effect to minimal error.

Briefly, in accordance with this invention, the magnetic hysteresis or magnetic memory error in a stepper motor is erased by sequencing the motor phases in a particular manner. More particularly, in positioning a transducer by energizing selected phases of the stepper motor, the sequence is selected to eliminate the memory of the previous stepper motor position, and reinforce only the new position. This cancellation is achieved by activating the stepper motor to move a tansducer from a given track position to an adjacent track position, the sequence of energization of the phases including at least one reversal of the magnetic sense of each phase that was energized to position the transducer at the initial track, but which is not to be energized at the target track; further, the phases not energized at the initial track but that are energized at the target track are reinforced by selective energization during more than one of the steps used for reaching the target track.

BRIEF DESCRIPTION OF THE DRAWINGS

The features and advantages of this invention will be better understood by referring to the following description given with reference to the accompanying drawings in which like reference numbers refer to like parts, and in which:

FIG. 1 is a curve illustrating the magnetic hysteresis phenomenon;

FIG. 2 is a block diagram of several basic elements of a disc drive transducer positioning system;

FIGS. 4A and 4B is a polar diagram of a forward step sequence and a reverse step sequence respectively in seeking from an initial track to a target track;

FIG. 5 is a timing diagram of the sequence followed in seeking from an initial track to a target track in a reverse seeking mode, i.e., from an inner track toward an outer track.

Figure 3:
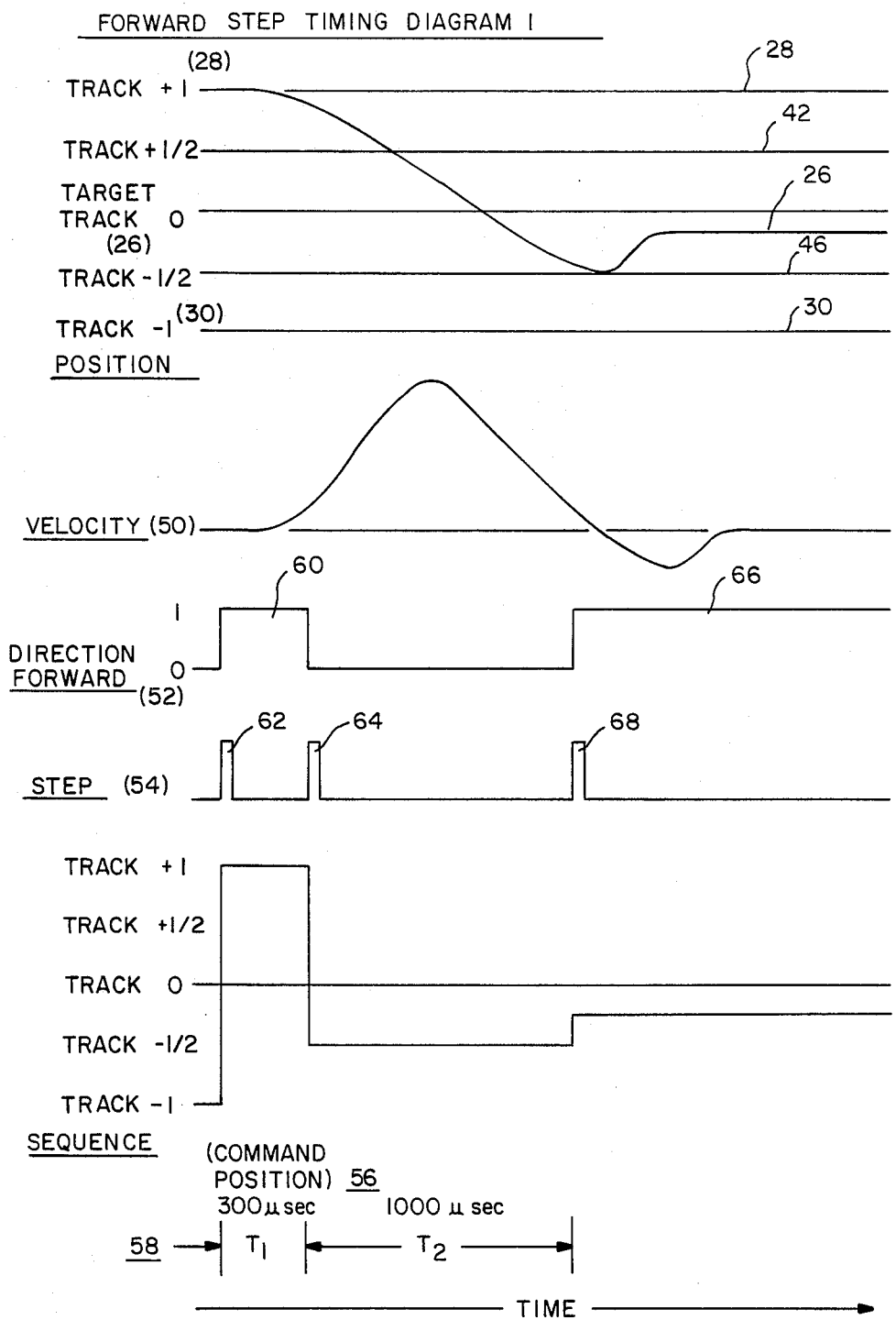
FIG. 3 is a timing diagram that illustrates the steps used to achieve minimum magnetic hysteresis in stepping a transducer forward from an initial or departure track to a target track.

Referring first to FIG. 2, a data storage system that would incorporate this invention is shown in schematic form therein, including a data surface 10 on which data is stored on a plurality of concentric tracks 12. The shaft 14 on which the disc or discs are mounted is rotated at a constant speed by a spindle motor not shown controlled by a spindle motor controller 16.

To access data on any one of the tracks 12, it is first necessary to accurately position the gap of the transducer 20 accurately over the selected track. As is well known in this technology, this positioning is achieved by selective energization of stepper motor coils 22 through a stepper motor controller 24. For further details of the actual structure of a disc drive, reference is made to application Ser. No. 914,690 filed Oct. 2, 1986, entitled ROTARY DISC DRIVE, Bronsvatch et al.; for a detailed description of a motor drive controller, reference is made to Ser. No. 929,559 filed Nov. 10, 1986, entitled COMBINED SERVO SYSTEM AND MOTOR CONTROL DRIVE, and assigned to Assignee of this invention. Both of said applications are incorporated herein by reference. For purposes of referring to the other drawings appearing in this application, it can be assumed that the transducer is of standard construction, and contains a gap indicated at 25 in FIG. 2, shown aligned with the initial track 26. The target track for a forward seek move is one track away and indicated by reference number 28. The target track for a reverse seek move to be described with reference to FIG. 5, is one track distant toward the outer circumference of the disc, and is indicated by the reference number 30. The target track is also referred to in several of the figures as track zero; the initial track as track −1. In the reverse step sequence explanation, the initial track is referred to as track +1 and the target track is again referred to as track 0.

The sequence diagrammed in FIG. 4A illustrates the step timing combination that will yield minimum magnetic hysteresis in positioning a transducer over a target track. Essentially, the steps illustrated in the diagram show energization of motor phases selected to move the transducer from its initial track 26, two steps or tracks forward, then 1½ tracks in reverse, then one track forward and finally ½ track reverse. The stepper motor control 24 positions the transducer by selective energizing the coils of the stepper motor 22. The phases of the motor activated to accomplish the hysteresis-reducing forward seek sequence of this invention are listed at the bottom of FIG. 4A below the polar diagram. It can be seen in this example, when the transducer gap 25 is aligned with the initial track 26, phases $\overline{BC}\overline{DE}$ are activated. At step 2 of the sequence, phases $\overline{ABDE}$ are activated, causing movement of the transducer toward track +1 shown at line 40 of FIG. 3. It should be noted in comparing the polar diagram of FIG. 4 and the charts of in FIG. 3, that the portion of the FIG. 3 labelled POSITION is a relatively accurate estimation of the actual physical position achieved by the transducer 25 as it moves across the surface of the disc. The actual velocity of the transducer during the period of this forward seek is represented at line 50 of FIG. 3, labelled VELOCITY. The control signals or command signals to the stepper motor electronics are the direction forward signal 52, and the step signal 54. A sequence of commanded positions is shown at 56, FIG. 3. The relative timing of the command signals and the duration of the command signals is illustrated at line 58 of FIG. 3.

Thus to move the transducer from initial track 26, to an overshoot track position 40 one track beyond the target track 28, the indicated phases $\overline{ABDE}$ are energized. The movement, termed the initial acceleration movement, lasts for a relatively brief time $t_1$ and is achieved by providing a command signal 60 on the direction forward line 52 and a step signal 62 concurrently with the presence of the direction forward signal.

The next movement commanded by the stepper motor control 24 is achieved by removing the direction forward signal 60, and providing the next step command 64, while energizing phases $\overline{ABCDE}$ to move the transducer toward the half track position 46 between the initial track 26 and target track 28. This command which constitutes the initial braking step continues for a time duration $t_2$, which is actually the longest duration command of about 1000 microseconds.

As the next step in the sequence, the stepper motor control activates motor phases $\overline{ABCDE}$, commanding movement of the transducer toward an intermediate overshoot track position 42 which is a half track position beyond the target track 28, but not as far as the overshoot track 40. This command is carried out by again providing a positive command signal 66 on direction forward line 52, and then transmitting the next step pulse 68. This will cause the next change in the velocity profile 50 or a forward damping step and effective hysteresis cancelling step to move the transducer head close to the target track 28.

Finally, the stepper motor control 24 activates phases $\overline{ACDE}$, hence the direction forward signal 66 and provides the final step pulse 70. This causes the transducer to seek onto the target track, with the magnetic hysteresis having been effectively cancelled. This final step lasts for about 600 microseconds.

The elimination of magnetic hysteresis in stepper motor sequences requires the phase balancing and magnetic memory erasure which are achieved by this sequence. Magnetic memory, as discussed above, is the retention of the step motor of the memory of its last position. The result of magnetic memory, if ignored, is an error vector from the magnetic memory of the step motor's last position summed in with the desired vector of the new target track position. In disc drives, this results in an off-track error which is unacceptable in tight tolerance situations.

In the sequence above, phases $\overline{D}$ and E are always energized so that they are neutral to the problem. The other phases are switched in the course of executing the sequence. It is important to note that the A phase which is to be a part of the ending position that is defining the target track is reinforced during the sequence since it is a part of the new position. In the same manner, phase C is reinforced through a majority of the steps. Also note that the undesired phase $\overline{B}$ which was energized at the initial track is cancelled by reversing its magnetic sense during the sequence. Thus, in the final desired position the unneeded B phase has been neutralized magnetically, leaving only desired phases on for the final position.

Note also that the timing of the relative steps is significant. During time t1, the power or acceleration step, the step motor is magnetically directed past its target track position, and the ability to erase its magnetic memory is established by the reversal of phase B. The time duration of this step adjusts its acceleration according to how far the target track 28 is to be overshot. During time period t2, the reverse braking step is carried out, decelerating the step motor as indicated both by the position profile at the top of FIG. 3 and the velocity profile 50. The time duration of this step adjusts the braking force to be applied to the moving transducer. Time period t3 is the forward damping step, the time duration of this step adjusting the magnetic hysteresis and other contributors to disc drive off-track. It is used to fine tune the accessing system to minimum off-track. Note that any undesired phase is again reversed from the previous step to substantiate the cancellation of the magnetic memory. At the final step, when the target track 28 is reached, only the desired phases are active, the undesired phases having been cancelled by repeated reversal. Using this sample sequence and fine tuning step, a less than ±2% off-track error can be expected in a stepper controlled disc drive accessing system.

The method and apparatus of the invention works equally well in the reverse direction, where, as illustrated in FIG. 2, the transducer is to be moved from an initial track 26 to a target track 30, located one track away toward the outer circumference of the data surface. As illustrated in the polar plot of FIG. 4B, the phase E that is active at initial track 26 and inactive at the target track 30 is reversed in polarity twice in the course of the step sequence. Thus, the elimination of the magnetic hysteresis in the reverse direction is the same as in the forward stepping example. It can be seen that phases $\overline{B}$ and C are always energized, such that they are neutral to the problem. The other phases are switched as the sequence is followed. Thus, the A phase is reinforced during the entire commanded position sequence shown in FIG. 5 and outlined on FIG. 4B. This is because the A phase is a part of the desired new position. In the same manner the phase $\overline{D}$ is reinforced during all of time periods t1, t2 and t3 of the command position sequence. However, the undesired phase E is cancelled by reversing its magnetic sense at least once (and this sequence, twice) during the stepping sequence. Thus, the same step parameters comprising a power or acceleration step from the initial track position to drive the transducer ultimately beyond the target track, the commands being applied for a period t1; a braking step applied for a longer period t2 to decelerate the transducer and apply a command back toward a position halfway between the initial track and the target track; a forward damping step to again command the transducer toward the target track while damping and braking its speed applied for a time period t3; finally, a command to bring the transducer to rest and the target track in this case, track 30.

It should be noted that this invention is used regardless of how many tracks are to be crossed in seeking from a departure track to a target track. The method is applied by considering a track adjacent to the target track as the "initial" track.

Modifications of this invention may become apparent to a person of skill in the art who studies this disclosure. Therefore, this invention is to be limited only by the following claims.

What is claimed:

1. A computer disc drive system comprising at least one disc having a plurality of concentric data tracks thereon, means for rotatably supporting said disc, means comprising an actuator for supporting a transducer over said disc for reading and writing digital information on said disc tracks, said system having positioning means for selectively positioning said transducer relative to said data tracks and said rotating disc, open loop position means coupled to said actuator comprising a multi-phase stepper motor for moving said actuator and thereby said transducer from track to track, and sequence control means for energizing the phases of the motor in a sequence that will erase magnetic memory error to move the transducer from an initial track x to a target track x+1, comprising power means for accelerating said transducer from initial track x past said target track x+1, brake means for braking said transducer to returning it to a position between initial track x and target track x+1, damping means for damping movement of said transducer while directing movement again past target track x+1, and for finally seeking said transducer to said target track x+1, said control means further comprising means for energizing a plurality of said phases to hold said transducer at initial track x and for de-energizing one of said phases to hold said transducer at target track x+1, said power means comprising means for reversing the energization of said one phase which is to be de-energized at target track x+1, whereby the ability to establish the magnetic memory of the de-energized phase is established.

2. A computer disc drive system as in claim 1 wherein said power means comprise means for accelerating said transducer past said target track x+1, whereby the ability to erase the magnetic memory of the motor phases is established.

3. A computer disc drive system as in claim 2 wherein each of said means for braking and means for damping comprise means for reversing the state of energization of said one de-energized phase.

4. A computer disc drive system as in claim 1 wherein each of said means for braking and means for damping comprise means for reversing the state of energization of said one de-energized phase.

5. In a computer disc drive having a stepper motor with several phases, a method of eliminating magnetic hysteresis in moving from initial track x where a given one of said phases is energized to a first polarity to a target track x+1 where said one given phase is de-energized, comprising the steps of accelerating said stepper motor to drive said transducer from initial track x past target track x+1 including the step of reversing the polarity of said one phase, braking said stepper motor to decelerate said step motor including the step of again reversing the polarity of said one phase, damping the stepper motor motion to position the transducer over target track x+1, including a final reversal of the polarity of said one phase to adjust magnetic hysteresis and other contributors to disc drive off-track.

6. A method as in claim 5 wherein said braking step energizes said motor to command positioning of said transducer between track x and track x+1.

7. A method as in claim 6 wherein the time of braking step is at least as long as the combined time of accelerating and damping steps.

* * * * *